United States Patent
Matthews (10) Patent No.: US 8,218,223 B2
(45) Date of Patent: Jul. 10, 2012

(54) PROCESS AND APPARATUS FOR SWITCHING LARGE-AREA ELECTROCHROMIC DEVICES

(75) Inventor: Jeremy Matthews, Furth im Wald (DE)

(73) Assignee: Econtrol—Glas GmbH & Co. KG, Plauen (DE)

( * ) Notice: Subject to any disclaimer, the term of this patent is extended or adjusted under 35 U.S.C. 154(b) by 60 days.

(21) Appl. No.: 12/544,311

(22) Filed: Aug. 20, 2009

(65) Prior Publication Data

US 2010/0172009 A1 Jul. 8, 2010

(30) Foreign Application Priority Data

Jan. 2, 2009 (EP) .................................. 09000003

(51) Int. Cl.
*G02F 1/15* (2006.01)
*G02F 1/153* (2006.01)
(52) U.S. Cl. ..................... 359/265; 359/269; 359/275
(58) Field of Classification Search .................. 359/265, 359/269, 270, 273, 275
See application file for complete search history.

(56) References Cited

U.S. PATENT DOCUMENTS

| | | | |
|---|---|---|---|
| 5,231,531 A | 7/1993 | Defendini | |
| 5,384,578 A * | 1/1995 | Lynam et al. | 345/105 |
| 5,822,107 A | 10/1998 | Lefrou | |
| 6,362,806 B1 | 3/2002 | Reichmann | |
| 6,721,080 B1 * | 4/2004 | Tench et al. | 359/265 |
| 7,277,215 B2 | 10/2007 | Greer | |
| 7,300,166 B2 * | 11/2007 | Agrawal et al. | 359/604 |
| 2002/0154379 A1 * | 10/2002 | Tonar et al. | 359/267 |
| 2007/0285759 A1 * | 12/2007 | Ash et al. | 359/275 |

FOREIGN PATENT DOCUMENTS

| | | |
|---|---|---|
| EP | 0475847 B1 | 8/1995 |
| EP | 0718667 A1 | 6/1996 |
| EP | 1517293 A1 | 3/2005 |
| WO | 9837453 | 8/1998 |
| WO | 0067070 | 11/2000 |

* cited by examiner

*Primary Examiner* — William Choi
(74) *Attorney, Agent, or Firm* — Marshall & Melhorn, LLC (57) ABSTRACT

A method is disclosed for controlling switching of an electrochromic device comprising at least the following components: a first and a second electrode layer, a first and a second layer in which ions can be reversibly intercalated, and a transparent ion-conducting layer. At least one of the layers in which ions may be reversibly inserted is electrochromic. The optical properties of the device are modified when a potential is applied between the electrode layers. The potential applied is limited such that the maximum generated potential difference never exceeds the safe redox limits, and that the current does not exceed some predetermined limit. Switching of electrochromic devices in this manner allows for maximum device lifetime, while simultaneously optimising switching speed and transmission homogeneity. The method is characterised in that the potential applied to the electrode layers is varied in the form of a stepped ramp, during which time the current is measured constantly.

15 Claims, 5 Drawing Sheets

PROCESS AND APPARATUS FOR SWITCHING LARGE-AREA ELECTROCHROMIC DEVICES

FIELD OF THE INVENTION

The present invention relates to a method and a system for switching a large-area electrochromic device. In particular, the invention concerns a method capable of switching electrochromic devices in a manner which ensures that safe electrical potentials are applied, while simultaneously optimising switching speed and homogeneity of optical transmission.

BACKGROUND OF THE INVENTION

Electrochromic materials undergo a change in optical properties when ions and electrons are inserted into them under the influence of an electric field. An electrochromic device may be constructed from such materials, such that the visual transmittance of said device changes when an electrical potential is applied between two electrodes. Electrochromic devices have many applications, including switchable glazings (where transmission of heat and light is regulated according to some scheme), automotive mirrors (where mirrors switch to prevent the driver from being dazzled by glare, etc.) and in display materials (where electrochromic devices take the folio of display elements to form switchable images).

The application of electrochromic materials in window glazings requires that the electrodes are of large area (>1 m$^2$) and operate at temperatures ranging from −20° C. to +80° C. These constraints place specific requirements on the materials available for electrochromic device construction, and affect the switching characteristics. The successful commercialisation of electrochromic devices as window glazings requires a substantial switching lifetime (>10 years), sufficient optical transmission homogeneity and reasonable switching time (<15 minutes); all of these factors are dependent on the switching algorithm used. The application of excessive electrical potentials causes side reactions to occur which result in device degradation and reduction of useful lifetime. The application of inappropriately low potentials results in excessive switching times. Switching of electrochromic devices must then be carried out in a manner which satisfies the requirements outlined above.

The useful lifetime of electrochromic devices depends primarily on the magnitude of the applied electrical potentials and on the amount of charge inserted into the electrochromic layers; the limits for these parameters may be readily determined by electrochemical experimentation. If the reversible charge injection limit for the electrochromic layers is determined, and layers are not overcharged during device switching (i.e. the reversible limits are not exceeded), it is then the applied potential which has the greatest influence on device lifetime.

Figure 1:
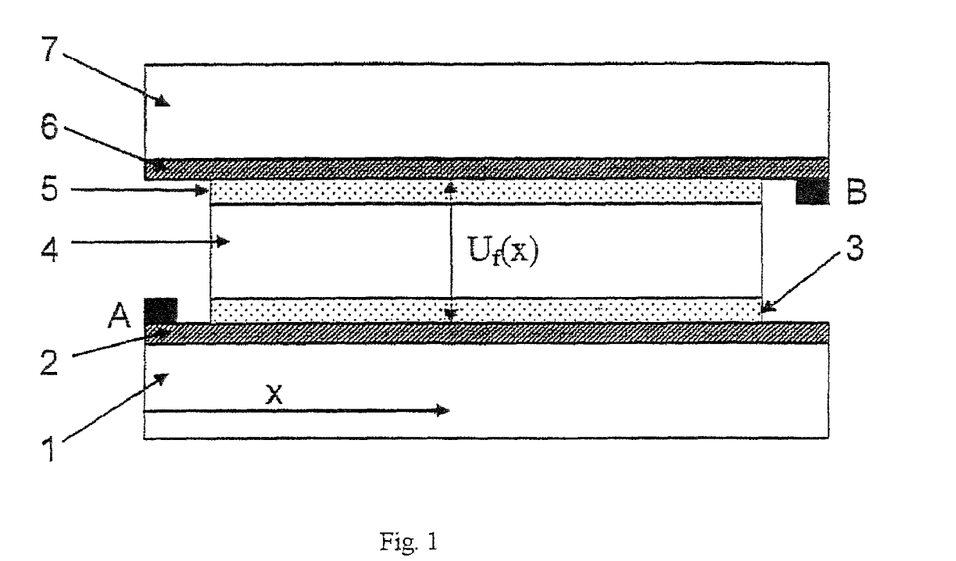
FIG. 1 shows a cross-sectional view of an electrochromic device according to the invention.

The range of potentials which may be applied between the electrode layers, without causing device degradation is often referred to as the redox stability range; the application of potentials outside this range causes device degradation thereby reducing lifetime. The redox stability range may be determined, for example, by cyclic voltammetry experiments at various temperatures. The optimisation of useful lifetime may then be made by simply limiting the electrical potential between the electrode layers to the redox stability range for that particular system. The difficulty in applying this idea lies in the fact that the potential is generally applied between two electrical contacts, which are on opposite sides of the electrochromic device (as shown in FIG. 1).

Typical electrochromic device structures as known from the state of the art comprise substrates (usually glass), electrode layers (electrically conducting), electrochromic layers and electrolyte (polymer or inorganic). Electrical contacts to the electrode layers are provided.

When a potential is applied between the contacts (contact potential, $U_{AB}$), a distributed electric field is generated between the electrode layers. The resistivity of the electrode layers is relatively high compared to metallic conductors (ca. 10-20 Ohm/sq) which results in a significant potential drop across each of the electrode layers. The resulting potential difference between the electrode layers at a given point x ($U_f(x)$), is then a function of displacement of point x from the electrode contacts. If an electrochromic cell has only two contacts it is not possible to directly measure the potential between the electrode layers $U_f(x)$. In order to ensure that the potential between electrode layers is within the redox stability range, it is necessary to estimate $U_f(x)$ or measure it directly (in which case at least three contacts are required).

The potential distribution described above is such that $U_f(x)$ is highest adjacent to cell contacts, and is lowest midway between the cell contacts. This causes switching (colouring and bleaching) to occur faster at the edges of the cell (near the contacts) than in the middle of the device (between the contacts); the so-called 'edge effect'. As the potential between the electrode layers is highest at the contacted edges of the cell, it is not necessary to simulate the potential distribution over the entire cell; it is sufficient to correlate the potential applied to the cell contacts with the maximum potential generated between the electrode layers ($U_{f,max}$). The applied potential may then be limited accordingly, thereby ensuring that the maximum potential generated between electrode layers $U_{f,max}$ remains within the safe redox limits.

Switching with high currents allows for faster response and therefore lower switching times, however results in higher inhomogeneity of transmission. The distribution of electrical potential between the electrode layers of a cell depends inherently on the resistance of the electrode layers and the cell current. High currents cause a greater internal potential drop across the electrode layers, which results in a less homogeneous potential distribution. In order to switch electrochromic devices with more homogeneous optical transmission, it is then useful to limit the cell current, however switching time becomes unacceptably long if current is too low. Fast switching and homogeneous switching are then mutually competitive aims, and a balance must be found between the two in order to optimise switching characteristics. It is then inherently necessary to be able to control cell current in order to switch cells with reasonable speeds and transmission homogeneity.

WO9837453 describes a method for switching electrochromic devices, according to which the preamble of the patent claim is formulated. This method involves switching an electrochromic device by applying a potential ramp from zero volts up to a predetermined temperature-dependent limit '$U_{max}$'. The current is continuously measured during the potential ramp, and the total resistance of the cell '$R_{ges}$' is calculated from the potential and current data. The effective potential at the electrochromic layers '$U_{eff}$' is calculated from the applied potential, the cell current and the total resistance ('$R_{ges}$'). The potential is applied such that '$U_{max}$' and '$U_{eff}$' are limited to temperature-dependent predetermined limits, until the desired optical/charge state is obtained.

This method has the following disadvantages:
1. The application of the electrical potential according to this method relies on the total cell resistance ('$R_{ges}$'), which is described as the sum of all of the ohmic resistances, between the cell contacts. The method theorises that this resistance may be used to ensure that safe electrochemical potential limits are not exceeded, during switching. The total cell resistance includes series resistances from cables, electrode layers, electrochromic layers and electrolyte. However, it has been experimentally shown that this theory does not work in practise, and the use of the resistance '$R_{ges}$' in controlling the switching of electrochromic devices results in the application of electrical potentials significantly exceeding safe electrochemical limits.

2. The method involves the calculation of the effective potential at the electrochromic layers '$U_{eff}$', which does not correspond to a discrete physical quantity. It is assumed that limiting the applied electrical potential according to '$U_{eff}$', will prevent degradation from occurring. In actual fact, limiting the applied electrical potential according to '$U_{eff}$', results in electrical potentials between the electrode layers which significantly exceed safe redox stability limits.

3. The method does not allow for optimisation of transmission homogeneity or switching speed as current is not controlled.

4. The method only allows for switching between completely coloured and bleached states.

EP 0 475 847 B1 describes a method for switching an electrochromic device by first applying a small voltage pulse, during which time the current is measured and used to estimate temperature and hence select an appropriate final switching potential. The switching is carried out under constant potential until either the current density reaches some predetermined threshold limit, the charge density reaches 10 $mC/cm^2$ or the desired transmission level is reached. This method also provides provisions for switching of an electrochromic device with three electrodes, whereby a potential difference is applied to two electrode contacts (contacts 1 and 2), such that the potential difference between contacts 2 and 3 remains constant.

This method does not allow for optimisation of transmission homogeneity or switching speed as current is not controlled. The use of electrochromic devices with three contacts allows the potential between the electrochromic layers to be accurately and safely controlled, provided that safe redox limits are not exceeded. Such devices are disadvantageous however, because the production process is unduly complicated as substrates must be cut to size and masked before coating (to allow for the third contact), thereby increasing production time and financial cost.

EP 0 718 667 A1 describes a system for switching electrochromic devices with two contacts, using a controller unit with user-interface, a power generator, temperature sensor, etc. This patent details methods for switching using either constant potential or constant current, with specific conditions and safety criteria provided for each method. The constant potential method involves application of a predetermined temperature-dependent potential to the cell until either the required charge density is reached or the current drops below some threshold value. The constant current method involves application of the current until either the required charge density is reached or the current drops below some threshold value. The second differential of potential with respect to time is calculated continuously, and the current set point is reduced (halved) if this exceeds some predetermined limit.

This method has the disadvantage that it limits either cell current or voltage, and not both. The constant current operation described in this method may be used to optimise switching speed and transmission homogeneity, however does not ensure that the potentials between electrode layers are within the safe redox limits. The potential generated between the electrode layers may be monitored using a 3-electrode system, however this increases complexity and expense. The reduction in applied current by 50% based on the second differential of potential with respect to time is a novel solution, however does not guarantee that safe redox limits will not be exceeded. The constant potential method does not allow for control of the cell current, hence cannot allow for optimisation of switching speed and transmission homogeneity simultaneously.

U.S. Pat. No. 7,277,215 B2 describes a system for switching electrochromic devices with three electrode contacts. Two of the electrodes are used for cell switching and the other two are used for heating and/or breakage detection. The microcontroller uses a variety of AC/DC techniques to colour and bleach the device, measure temperature, heat the device and detect mechanical breakage of the pane. The controller uses an internal circuit which is matched to external conditions in order to calculate leakage current and adjust switching parameters accordingly. This system is extremely complicated and requires that the internal circuitry of the controller be well matched to the specific properties of the EC device. The disclosed system offers a novel solution to the problems concerned with leakage current in EC devices with inorganic ion conductors, however is unduly complex for systems with organic ionic conductors.

Despite these advances, there remains a need for a switching method for electrochromic devices which:

1. ensures that the potential between the electrode layers is always between safe redox limits, even for devices with two electrode contacts;
2. allows for optimisation of switching speed and transmission homogeneity, via limitation of the applied cell current.

SUMMARY OF THE INVENTION

The present invention solves the problems identified in the prior art as described above.

The object of the present invention is to provide a method of switching an electrochromic device which ensures that potentials between film electrodes are always between safe redox limits, while simultaneously allowing optimisation of transmission homogeneity and switching speed by limiting cell current.

In order to switch an electrochromic device in a safe fashion, it is crucial that the potential applied between the electrodes does not exceed the safe redox limits. These limits may be predetermined from electrochemical studies, for example cyclic voltammetry. Unfortunately, it is not normally possible to measure the potential difference between the electrode layers directly, because the two electrode contacts are on opposite sides of the cell. It is then only possible to directly measure the applied contact potential $U_C$ and estimate the potential difference between the electrode layers. The potential between the electrode layers varies significantly over the area of the cell depending on the distance from the two electrode contacts, however the largest potential difference between electrode layers always occurs at the edges of the cell, adjacent to the electrode contacts. It is then not necessary to know the complete potential distribution of the cell under a given set of conditions; it is sufficient to know the maximum potential difference between the electrode layers and ensure that this is within safe electrochemical limits, in order to switch a device in a safe manner, thereby ensuring maximum lifetime.

It was found that the relationship between the applied contact potential and the maximum potential difference generated between the electrode layers may be described by a simple equation, involving cell current and a constant resistance. This resistance is only dependent on cell width and height and on material properties of the electrode layer. This resistance is almost independent of temperature, hence is unaffected by electrolyte conductivity. This is advantageous, because it is not necessary to know the electrolyte conductivity in order to ensure that safe potentials are generated between the electrode layers.

The potential difference applied to the cell contacts is distributed across the electrode layers due to the resistive nature of the electrode layers (see background of the invention). It can however be shown that the maximum potential difference generated between the electrode layers $U_{f,max}$ (i.e. occurring at the cell edges adjacent to the electrode contacts) can be calculated using the formula:

$$U_{f,max} = U_C - i_C R_{Eff} \qquad \text{Equation 1}$$

where $U_C$ is the potential applied to the cell contacts, $i_C$ is the cell current and $R_{Eff}$ is the effective resistance (Ohms) of the cell. The effective resistance $R_{Eff}$ may be calculated from cell dimensions as follows:

$$R_{Eff} = \left(\frac{w}{h}\right) \times k, \qquad \text{Equation 2}$$

where w and h are cell width and height in centimeters, where the height corresponds to the length of the contacted cell edges. k is a constant which is representative of the material used for the electrode layer in electrochromic devices (independent of device dimensions). The effective resistance is a constant which relates the potential applied to the cell contacts $U_C$, to the maximum potential generated between the electrode layers $U_{f,max}$. The effective resistance is a function of cell dimensions and needs only be calculated once, preferably before the start of the switching process. The calculation of a single value for effective resistance requires only that the width and height of the device, as well as the material constant k are known, and provides a concrete link between the applied cell contact potential and the maximum potential between the electrode layers.

The maximum potential between the electrode layers can not be controlled directly, as only the potential applied to the cell contacts can be controlled. It is however possible to indirectly limit the potential between the electrode layers, by limiting the cell contact potential ($U_C$) appropriately. If the safe redox limit $U_{EC}$ is predetermined for a given switching process (coloration or bleaching), then the applied contact potential can be limited appropriately using the following calculation:

$$U_{C,max} = U_{EC} + i_C R_{eff} \qquad \text{Equation 3}$$

If the potential applied at the cell contacts $U_C$ is maintained below the maximum limit $U_{C,max}$, then it is indirectly ensured that the maximum potential between the electrode layers $U_{f,max}$ does not exceed its corresponding safe redox limit $U_{EC}$.

According to the invention, provision is made for the cell potential $U_C$ and current '$i_C$' flowing through the device to be measured continuously. Electrical potential is applied to the contacts of the device in the faun of a stepped ramp, starting at a fixed potential and increased in predetermined potential increments, $U_{step}$ (10-100 mV) until specific conditions are fulfilled. The stepped potential ramp is applied in such a way as to ensure that two criteria are fulfilled:
  1. Maximum potential between electrode layers $U_{EC,max}$ does not exceed the temperature-dependent safe electrochemical limit $U_{EC}$;
  2. Cell current does not exceed the predetermined (temperature-dependent) limit $i_{max}$.

The use of a constant electrical potential in this method allows electrochromic devices to be switched with potentials which are always maintained within the safe redox limits The use of a current limit allows the switching speed and transmission homogeneity to be optimised. This process may be divided into several stages which may best be described by referring to the associated drawings.

DETAILED DESCRIPTION OF THE INVENTION

FIG. 1 shows a cross-sectional view of a typical electrochromic device. A glass substrate 1 is coated with a first electrode layer 2, on which is coated a first layer 3 in which ions may be reversibly inserted. The first layer 3 in which ions may be reversibly inserted is electrochromic in nature. An ion-conducting layer 4 separates the first layer in which ions may be reversibly inserted, from the second layer 5 in which ions may be reversibly inserted. The ion-conducting layer 4 may be an organic polymer, however is not restricted to such materials. The second layer 5 in which ions may be reversibly inserted acts as a counter electrode to the first layer 3 in which ions may be reversibly inserted, and may or may not be electrochromic in nature. The layered structure of the device is completed by a second glass substrate 7 which is coated with a second electrode layer 6. The electrode layers 2, 6, are provided with electrical contacts (A and B) between which an electrical potential may be applied.

Figure 2:
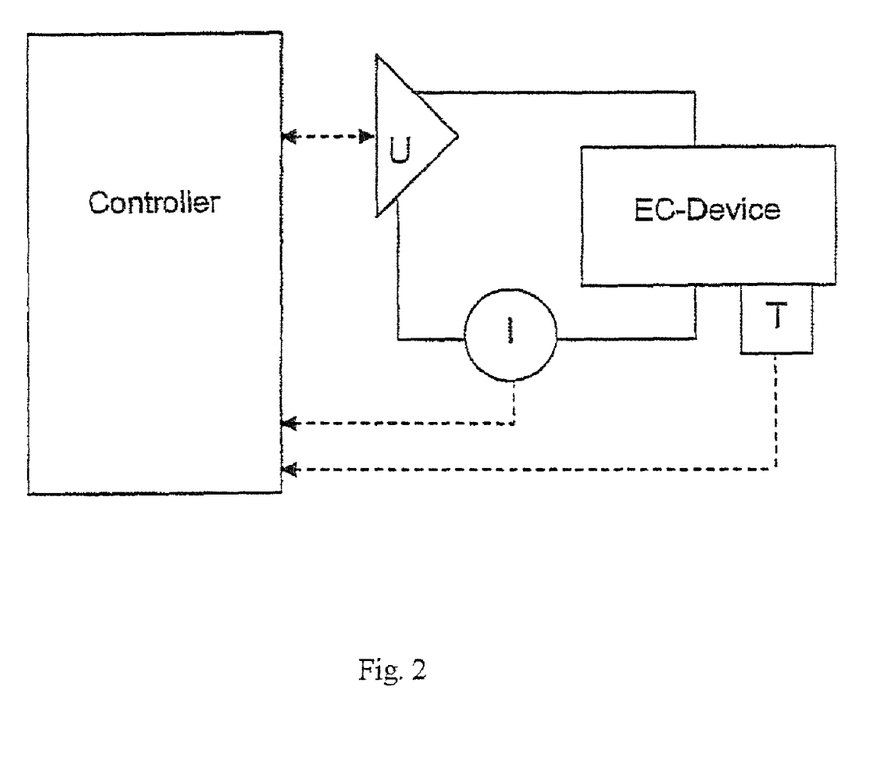
FIG. 2 shows a block diagram for a controller unit, showing measurement and control parameters required for switching of an electrochromic device according to the invention.

FIG. 2 shows a simplified block diagram of the hardware required for switching of an electrochromic device according to the invention. A potential is generated by a suitable voltage source (U), and may be applied to cell contacts A and B by switching suitable relays. The voltage source may also include a means for measuring the applied potential, the measured values then being sent back to a controller for analysis. Provision is made for the cell current to be continuously measured by the use of a suitable ammeter, the measured values being sent to the controller on a cyclic basis. Measurement of the temperature of the electrochromic device is provided for by the use of a temperature sensor, which may be incorporated into the structure of the electrochromic device. The magnitude of the electrical potential to be applied to the cell contacts is calculated by the controller based on values of temperature, electrochemical potential limits (safe redox limits) and cell current. The controller controls the entire switching process based on the use of a specific algorithm which is detailed below. The controller is therefore able to perform calculations according to the switching algorithm described below, preferably using a microprocessor for software control. The controller software also allows for calculation of charge density, by integration of measured current with respect to time. Such a controller has been previously described in WO0067070.

Figure 3:
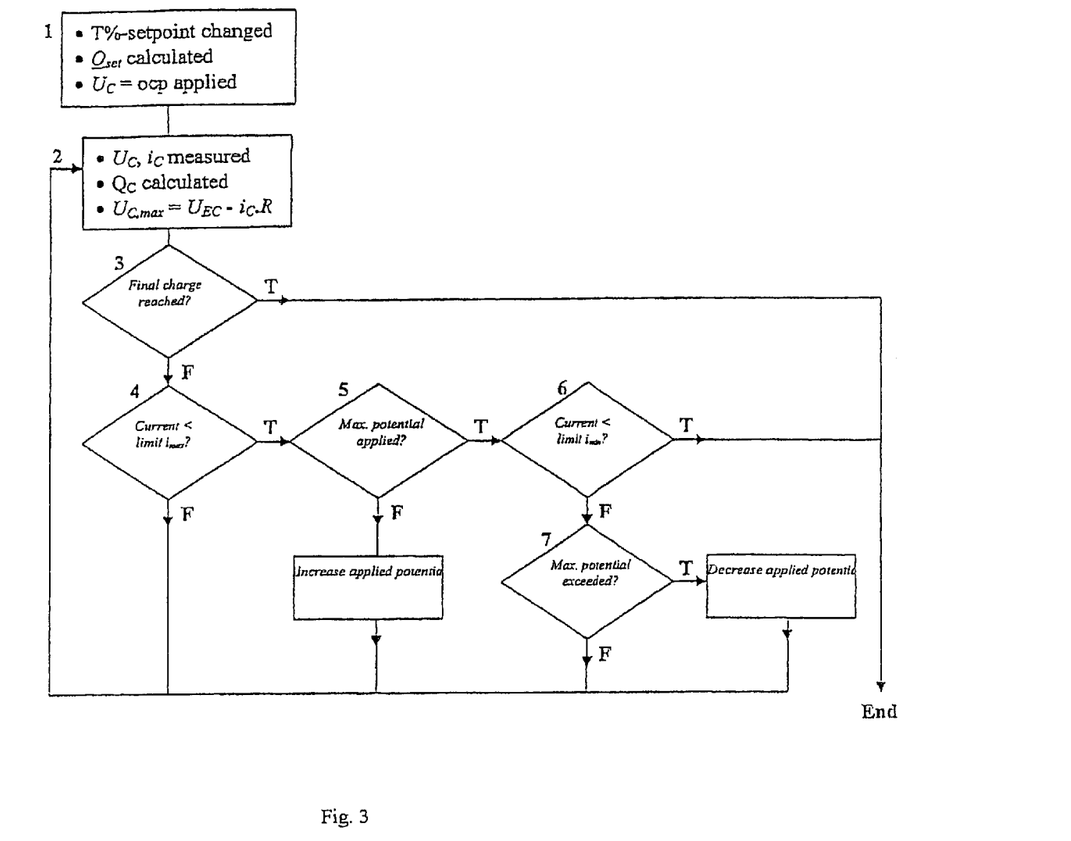
FIG. 3 shows a flow diagram for the switching algorithm defined by the invention.

The switching of the electrochromic device (modification of device transmission) is performed by controlling the electrical potential applied to contacts A and B according to a specific algorithm, as detailed in FIG. 3. The electrical potential applied to the contacts of the electrochromic device during switching is limited such that two conditions are satisfied:

I. The maximum potential generated between the electrode layers ($U_{f,max}$) does not exceed the temperature dependent safe redox limit ($U_{EC}$).

II. The applied electrical potential is increased in a stepwise fashion, only when the measured cell current is below a predetermined temperature-dependent limit.

The switching algorithm according to the invention is described below with the aid of references to FIG. 3. Various parameters corresponding to the electrochromic device must be saved in the memory of the controller before the switching process may be started. Necessary parameters include:

Height and width of the electrochromic device;
Resistance constant for electrode layers;
Safe electrochemical limits ($U_{EC}$) for coloration and bleaching processes;
Maximum current limit (calculated according to switching time/transmission homogeneity considerations);
Potential step size ($U_{step}$);
Minimum current ($i_{min}$);

1. A switching process (coloration or bleaching) is started when the transmission set-point is changed. This action may be performed by a user interaction (e.g. by pressing a button on the controller) or by a remote control system (e.g. via software command from a control computer). The charge density ($Q_{set}$) corresponding to the desired transmission set-point is preferably determined either by direct calculation or by interpolation from a lookup table. The desired charge density is compared with the actual charge density, and the step designated as coloration or bleaching accordingly. The open circuit potential of the electrochromic device is measured, and this potential is then applied to the cell contacts.

2. The cell potential and current are measured and the charge density is calculated from current-time data (or measured directly with integrator electronics). The maximum safe cell potential $U_{C,max}$ is calculated from Equation 3 as stated above.

3. Charge-limiting condition: Switching may continue only until the desired charge density is reached. The controller compares the current charge density with the desired charge density ($Q_{set}$), and forces termination of the switching process when the desired charge density has been reached.

4. Current-limiting condition 1: The applied potential may only be increased if the cell current is less than the maximum cell current ($i_{max}$), determined according to the equation $i_{max}=(j_{max} \times Area)F(T-T_0)$, where j is current density, Area is the active cell area, T is the temperature of the electrochromic element, and $T_0$ is a reference temperature, thereby the factor F allowing for modification of the current according to temperature, thereby allowing modification of switching speed with respect to temperature. The controller compares the measured current with the maximum current limit; the applied potential may only be increased if the cell current is below the maximum limit. If the cell current is above the maximum current limit, the process returns to step 2 above. The cell current decreases rapidly under constant potential, thereby only allowing the cell current to exceed the limit $i_{max}$ for a short time and by a small amount (typically a few milliamperes).

5. Potential-limiting condition 1: The algorithm ensures that the potential between the film electrodes does not exceed the safe electrochemical limit, by limiting the applied cell contact potential $U_C$ to the maximum safe limit $U_{C,max}$ determined using Equation 3 in step 2 above. If the maximum safe potential limit $U_{C,max}$ has not yet been reached, then the applied cell potential is increased by the predetermined potential step $U_{step}$ and step 2 follows;

i.e. $U_{C,f}=U_{C,i}+U_{step}$, where $U_{C,f}$ and $U_{C,i}$ are final and initial potentials respectively. If the maximum safe potential limit $U_{C,max}$ has been reached, then the process continues to the next step (Current-limiting condition 2, step 6)

6. Current-limiting condition 2: The switching process is allowed to continue until the predetermined minimum cell current ($i_{min}$) is reached. Cell current is proportional to switching speed; hence this condition terminates the switching process once the speed of the process falls below some acceptable limit. This limit may be defined as an absolute current in milliamperes, or more conveniently as a percentage of the maximum cell current $i_{max}$.

7. Potential-limiting condition 2: This condition occurs only when the maximum potential has already been reached; switching is then taking place under constant potential $U_C$ and current is decreasing. The decreasing current causes a decrease in the maximum safe potential limit $U_{C,max}$ according to Equation 3 above. The applied cell potential may then ultimately exceed the maximum safe limit as current decreases; in this case the applied potential is reduced by the predetermined potential step $U_{step}$ and step 2 follows;

i.e. $U_{C,f}=U_{C,i}-U_{step}$, where $U_{C,f}$ and $U_{C,i}$ are final and initial potentials respectively. If the maximum safe potential limit $U_{C,max}$ has not been reached, then the process returns to step 2.

The switching process is terminated when either the desired current density is obtained, or when the minimum current limit is reached. This procedure is generally identical for either coloration or bleaching, however the appropriate safe potential limits must be applied according to switching direction (coloration or bleaching). To ensure complete bleaching, the maximum safe contact potential $U_{C,max}$ may be applied for a longer time period after the minimum current has been reached; this is advantageous in the case where cell currents are low, such as for small-area electrochromic devices, especially operating at low temperature, in particular where the resolution of current measurement lies close to the minimum current limit. In such cases, it is useful to increase the bleaching time according to the following equation:

$\Delta t_{Bl}=(T_{lim}-T) \times F$, where $\Delta t_{Bl}$ is additional bleaching time, and corresponds to an extension of the bleaching time after the minimum current density has been reached. T is the device temperature and $T_{lim}$ is the limiting (maximum) temperature, for which the bleaching process should be extended. F is an appropriate factor which designates how long the bleaching process should be extended, for every degree Celsius below the minimum temperature. As an example, consider an electrochromic device bleaching at 5° C. whereby minimum temperature $T_{min}$ and temperature factor F have values of 10° C. and 30 s/° C. respectively. The current flowing during bleaching of the device will be relatively low as ion-transport is slow at low temperature, hence the calculated minimum current limit may fall below the resolution of the current measurement device. In this case, the bleaching process is allowed to occur until the minimum current limit is reached, and the bleaching time extension is calculated according to:

$$\Delta t_{Bl} = (T_{min} - T) \times F = (10-5) \times 30 = 150 \text{ s}.$$

The maximum safe contact potential $U_{C,max}$ is then applied for a further 150 s after the minimum current has been reached, thereby ensuring that the device is bleached completely, regardless of temperature or resolution of the current measurement. At the end of the bleaching process, the charge counter is reset to zero which then corrects any errors with charge measurement during the extended bleaching process, which may be caused by resolution of the current measurement.

EXAMPLES

The invention will be further explained using as example the switching of a 40×80 cm² electrochromic device, from a completely bleached to coloured state. Before switching begins, the relevant parameters are saved in the memory of the controller. The relevant parameters are as follows:

1. Electrochromic device height (length of contacted edges)=40 cm
2. Electrochromic device width (length of non-contacted edges)=80 cm
3. Resistance constant for electrode layers (k)=10 Ohm
4. Maximum current density ($j_{max}$)=33.3 µA/cm², as calculated according $$j_{max} = \left(\frac{Q_{max}}{\text{Time}}\right) = \frac{20}{600} \frac{mC}{s \cdot cm^2} = 33.3 \frac{\mu A}{cm^2},$$

where ($Q_{max}$) is the maximum charge density corresponding to the completely coloured state and (Time) is the desired switching time.

5. The maximum current ($i_{max}$) is calculated according to $$i_{max} = (j \times \text{Area}) + (T - T_0) \times F$$
$$= \left(33.3 \frac{\mu A}{cm^2} \times 3200 \text{ cm}^2\right) + (T - T_0) \times F$$
$$= 107 \text{ mA},$$

assuming F=0 in this example, for sake of simplicity.

6. Safe coloration potential limit ($U_{ec,col}$)=+3.00 V at 0° C.
7. Effective resistance of the electrochromic device, as calculated using Equation 2:

$$R_{Eff} = \left(\frac{w}{h}\right) \times k = \left(\frac{40}{80}\right) \times 10 = 20 \Omega$$

8. Potential step ($U_{step}$)=20 mV.
9. Safe bleaching potential limit=−2.90 V at 0° C.
10. Minimum current limit=10% of maximum current.

Figure 4:
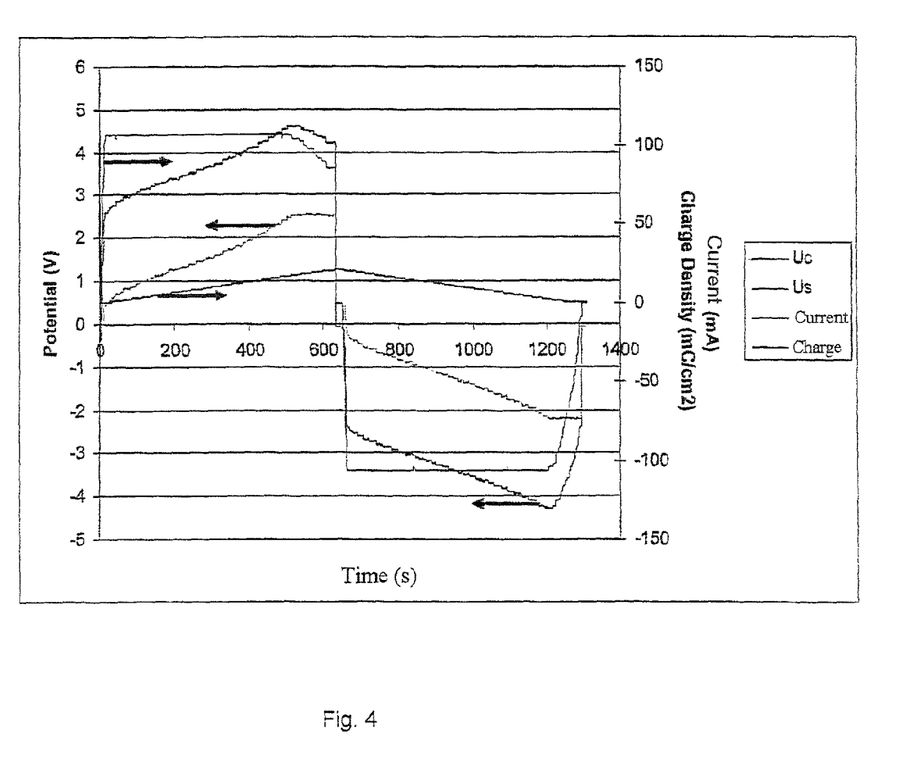
FIG. 4 shows a graph illustrating the switching characteristics (potential, current and charge density) during coloration and bleaching of an electrochromic device according to the invention.
Figure 5:
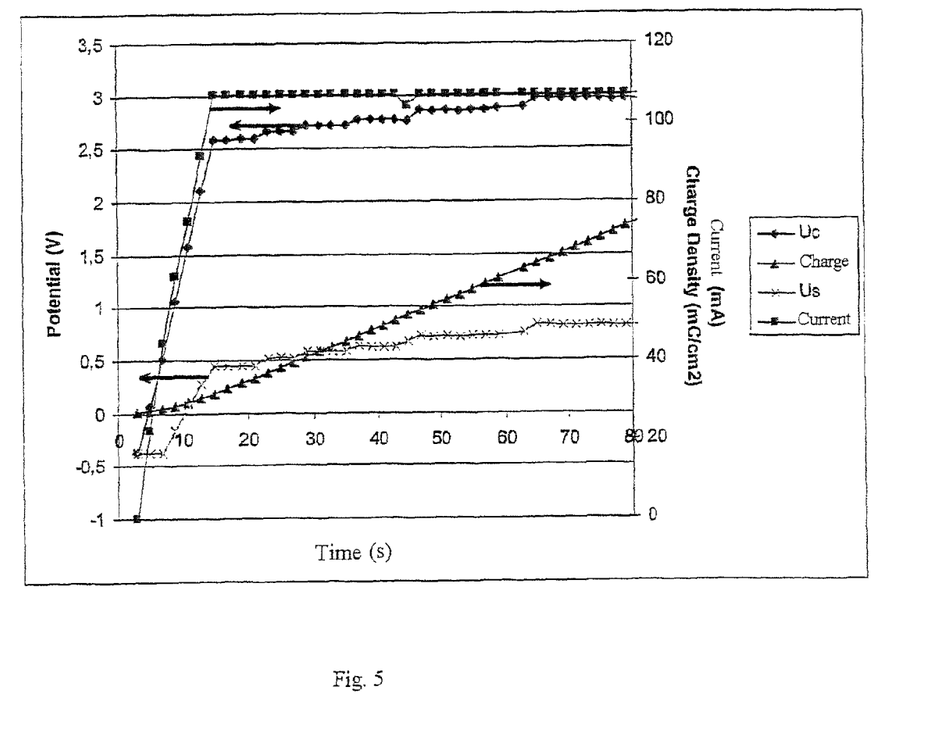
FIG. 5 shows the same graph as in FIG. 4, resealed however to show only the first 80 seconds of coloration.

The following conventions will be used in this example for the sake of clarity. Coloration is effected by increasing the cell potential in a positive direction, an associated positive current flows and there is a corresponding increase in charge density. Decreasing the potential (in a negative direction) then causes bleaching to occur, and a negative current to flow, and a decrease in charge density results. The fully bleached and coloured states correspond to charge densities of 0 and 20 mC/cm² respectively. FIG. 4 shows the switching characteristics for this example, according to the invention.

When the switching command is received (from user or as remote command), the controller calculates the charge density corresponding to the desired transmission state. If the user selects the completely coloured state, then the desired charge density is 20 mC/cm² in this example. The controller then compares the momentary charge density (0 mC/cm², fully bleached) with the desired charge density (20 mC/cm², fully coloured) and designates the switching step as coloration.

The open circuit potential (ocp) of the electrochromic device is then measured (potential by zero current) and the controller then causes the voltage source to output the cell contact potential ($U_C$), equal to the measured cell ocp. In the case of this example, the ocp was −0.382 V.

The controller then reads the temperature of the electrochromic device from the temperature sensor (45° C. in this example) and calculates the safe electrochemical limit for coloration according to:

$$U_{EC} = A + BT = 3.0 \text{ V} - 0.01 \frac{V}{°C} \times 45° C. = 2.55 \text{ V},$$

where T is the temperature of the electrochromic element and A and B are constants related to electrochromic device design.

The initial current is 0 mA (after application of ocp to cell contacts) and $U_{C,max}$ is then calculated by the controller according to $$U_{C,max} = U_{EC} + i_C R_{Eff} = 2.55 V + (0 A \times 10\Omega) = 2.55 V$$

As the initial contact potential is lower than the calculated maximum contact potential, and the current is lower than the calculated maximum current, the contact potential is then increased, using the equation $$U_{C,f} = U_{C,i} + U_{step} = -0.382 V + 0.02 V = -0.362 V$$

The applied contact potential is then initially increased in a stepwise fashion (repeating Steps 2 to 4 in FIG. 2), until the maximum current is reached, until the maximum potential limit is applied or until the desired charge density is obtained. If the desired charge density is obtained, then the controller terminates the switching process and disconnects the electrochromic device from the voltage source. If the maximum current is reached, the potential remains constant until the current decays below the maximum limit $i_{max}$. The applied potential is then increased in this stepwise fashion, until the maximum potential limit $U_{C,max}$ is reached.

In the example shown in FIGS. 3 and 4, the applied cell potential is increased in steps of 20 mV until the cell current limit of 107 mA is reached, after about 15 seconds. The applied cell contact potential current at this time is 2.58 V, however the maximum potential generated between the electrode is only 0.44 V. This is calculated according to the equation:

$$U_{f,max}=U_C-i_C R_{Eff}$$

The cell current is then held approximately constant, by only increasing the cell contact potential when the current falls below 107 mA. During this time, the maximum cell contact potential $U_{C,max}$ is continuously calculated by the controller according to $$U_{C,max}=U_{EC}+i_C R_{Eff}=2.55\ V+(0.107\ A\times 20\Omega)=4.69\ V$$

The cell contact potential $U_C$ is then increased in 20 mV steps according to $$U_{C,f}=U_{C,i}+U_{step},$$

until approximately 510 seconds have passed, at which time the maximum potential limit $U_{C,max}$ is reached.

Once the maximum potential limit $U_{C,max}$ is reached, the applied cell potential is held constant and current decreases as the electrochromic reaction slows. The maximum potential limit $U_{C,max}$ is recalculated on a cyclic basis (several times per second) and reduces as the cell current decreases. It is then possible that the cell contact potential $U_C$ will exceed the maximum potential limit $U_{C,max}$ during the end of coloration or bleaching; in this case the applied contact potential must be reduced in a stepwise fashion according to $$U_{C,f}=U_{C,i}-U_{step}$$

The switching process is terminated by the controller when the desired charge density is obtained, in this case 20 mC/cm².

In example shown in FIG. 4, the cell current decays under the constant potential from about 510 seconds, and the applied cell contact potential is appropriately reduced, effectively maintaining the maximum potential between the electrode layers $U_{f,max}$ at its constant temperature dependent limit of 2.55 V. The desired charge density of 20 mC/cm² is reached after a total coloration time of 632 s, at which time the electrochromic device is electrically disconnected from the voltage source. After a pause of 20 seconds, the electrochromic device is bleached in a similar fashion to the coloration process described above, as follows:

1. The temperature of the electrochromic device is read by the controller, at 45° C.
2. The safe electrochemical limit for bleaching is calculated by the controller according to:

$$U_{EC}=A+BT=-2.9\ V+0.01\frac{V}{°C.}\times 45°\ C.=2.45\ V$$

3. The open circuit potential is measured at 0.950 V.
4. A potential of 0.950 V is applied to contacts of the electrochromic device.
5. The cell contact potential is decreased in steps of 20 mV (i.e. potential stepped in negative direction), until the maximum current limit of −107 mA is reached.
6. The maximum cell contact potential $U_{C,max}$ is continuously calculated by the controller according to:

$$U_{C,max}=U_{EC}+i_C R_{Eff}=-2.45\ V+(-0.107\ A\times 20\Omega)=-4.59\ V.$$

7. The cell contact potential is then decreased only when the magnitude of the cell current falls below 107 mA, until the maximum potential limit $U_{C,max}$ (−4.59 V, in this case negative in magnitude for bleaching) is reached.
8. The magnitude of the applied contact potential is then reduced in a stepwise fashion according to:

$$U_{C,f}=U_{C,i}-U_{step},$$

as the bleaching cell current decreased.
9. The switching process is terminated by the controller when the minimum current limit of 10.7 mA (10%×107 mA) is reached. The final charge density is 0.1 mC/cm², and the charge counter is then set to 0 mC/cm², and the electrochromic device electronically is disconnected from the voltage source.

The invention claimed is:

1. A process for switching an electrochromic cell comprising at least the following components:
   a first and a second electrode layer;
   a first and a second layer, in which ions may be reversibly inserted; and
   an ion-conducting layer;
   wherein at least the first layer, in which ions may be reversibly inserted, is electrochromic; and
   wherein the first and the second layer, in which ions may be reversibly inserted, are counter electrodes to each other;
   comprising the steps of:
   measuring continuously the current ($i_C$) flowing through the cell when a voltage is applied to the electrode layers; and
   applying a voltage to the electrode layers and varying the applied voltage in steps of 10-100 mV as a function of current, such that the voltage generated between the electrode layers is kept within predetermined temperature-dependent safe redox limits, and the cell current is limited to predetermined temperature-dependent limits, wherein the applied voltage is only increased if the cell current is less than a maximum cell current ($i_{max}$), determined according to $$i_{max}=(j_{max}\times \text{Area})+(T-T_0)\times F,$$

where $j_{max}$ is current density, Area is the active cell area, T is the temperature of the electrochromic element, and $T_0$ is a reference temperature wherein a factor F allows for modification of the current according to temperature, thereby allowing modification of switching speed with respect to temperature.

2. The process in accordance with claim 1, wherein the temperature dependence of the safe redox limits ($U_{EC}$) is calculated according to the equation:

$$U_{EC}=A+BT,$$

where T is the temperature of the electrochromic element and A and B are constants related to electrochromic device design.

3. The process in accordance with claim 1, wherein the maximum current density ($j_{max}$) is calculated from a maximum acceptable switching time, according to the equation $$j_{max}=\left(\frac{Q_{max}}{\text{Time}}\right),$$

where $Q_{max}$ is the maximum charge density corresponding to the completely colored state and Time is the maximum acceptable switching time.

4. The process in accordance with claim 1, wherein an effective resistance ($R_{eff}$) is calculated from cell dimensions and at least one material constant before starting the switching process.

5. The process in accordance with claim 4, wherein the effective resistance ($R_{eff}$) is calculated from cell width, where width refers to the separation between the electrode contact strips, height, where height corresponds to the length of the contacted edges, and at least one material constant (k), according to the equation $$R_{Eff} = \left(\frac{w}{h}\right) \times k.$$

6. The process in accordance with claim 5, wherein a maximum voltage generated between the electrode layers is calculated from an applied contact voltage ($U_C$), the cell current ($i_C$), and the effective resistance ($R_{eff}$).

7. The process in accordance with claim 6, wherein the maximum voltage generated between the electrode layers is calculated according to the equation $$U_{f,max} = U_C - i_C R_{eff}.$$

8. The process in accordance with claim 7, wherein the maximum voltage which may be safely applied to the electrode layers is calculated from the temperature-dependent safe redox limits ($U_{EC}$), the cell current ($i_C$), and the effective resistance ($R_{eff}$).

9. The process in accordance with claim 8, wherein the maximum voltage which may be safely applied to the electrode layers is calculated from the temperature-dependent safe redox limits ($U_{EC}$), the cell current ($i_C$) and the effective resistance ($R_{eff}$), according to the equation $$U_{C,max} = U_{EC} + i_C R_{eff}.$$

10. The process in accordance with claim 1, wherein an applied cell voltage is modified in a stepwise fashion, increased for coloration, decreased for bleaching, as long as the cell current remains below a predetermined current limit ($i_{max}$), until a maximum cell contact voltage limit ($U_{C,max}$) is reached.

11. The process in accordance with claim 10, wherein the applied cell voltage is modified in a stepwise fashion until the maximum cell contact voltage limit ($U_{C,max}$) is reached, according to the equation $$U_{C,f} = U_{C,i} + U_{step},$$

with voltage step size ($U_{step}$) being positive for coloration, and negative for bleaching, and with final and initial voltages, $U_{C,f}$ and $U_{C,i}$, respectively.

12. The process in accordance with claim 10, wherein the applied cell voltage is modified in a stepwise fashion after the maximum cell contact voltage limit ($U_{C,max}$) is reached, according to the equation $$U_{C,f} = U_{C,i} - U_{step},$$

with voltage step size ($U_{step}$) being positive for coloration, and negative for bleaching, and with final and initial voltages, $U_{C,f}$ and $U_{C,i}$, respectively.

13. The process in accordance with claim 1, wherein a bleaching process, and therefore charge extraction, is extended for a specific period of time, $\Delta t_{Bl}$, which is calculated according to the equation $$\Delta t_{Bl} = (T_{min} - T) \times F,$$

wherein $\Delta t_{Bl}$ is the additional bleaching time, $T_{min}$ is a minimum temperature and T is the device temperature.

14. The process in accordance with claim 1, wherein both layers in which ions may be reversibly inserted are electrochromic.

15. The process in accordance with claim 1, wherein the first and the second electrode layers are optically transparent.

* * * * *